(12) United States Patent
Omiya et al.

(10) Patent No.: US 10,196,011 B2
(45) Date of Patent: Feb. 5, 2019

(54) GLASS CHOPPED STRAND MAT, GLASS CHOPPED STRAND MAT ROLL, METHOD FOR MANUFACTURING GLASS CHOPPED STRAND MAT AND AUTOMOTIVE MOLDED CEILING MATERIAL

(71) Applicant: NITTO BOSEKI CO., LTD., Fukushima (JP)

(72) Inventors: Mitsuhiro Omiya, Tochigi (JP); Masatoshi Suzuki, Tochigi (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 15/834,385

(22) Filed: Dec. 7, 2017

(65) Prior Publication Data

US 2018/0099625 A1 Apr. 12, 2018

Related U.S. Application Data

(62) Division of application No. 15/124,299, filed as application No. PCT/JP2014/084163 on Dec. 24, 2014.

(30) Foreign Application Priority Data

Mar. 10, 2014 (JP) .................................. 2014-046597

(51) Int. Cl.
*B60R 13/02* (2006.01)
*B32B 27/06* (2006.01)
(Continued)

(52) U.S. Cl.
CPC .......... *B60R 13/0212* (2013.01); *B29B 15/12* (2013.01); *B32B 5/02* (2013.01);
(Continued)

(58) Field of Classification Search
CPC ..... B29B 15/12; B60R 13/0212; B60R 13/02; D04H 1/4218; D04H 1/4374; D04H 1/58;
(Continued)

(56) References Cited

U.S. PATENT DOCUMENTS 3,684,645 A * 8/1972 Matthews ............. B29C 70/081
428/220
4,417,012 A 11/1983 Moniotte
(Continued)

FOREIGN PATENT DOCUMENTS

CN 1960858 A 5/2007
CN 101331255 A 12/2008
(Continued)

OTHER PUBLICATIONS

International Search Report issued in corresponding International Patent Application No. PCT/JP2014/084163 dated Feb. 24, 2015.
(Continued)

*Primary Examiner* — Camie S Thompson
(74) *Attorney, Agent, or Firm* — Morgan, Lewis & Bockius LLP

(57) ABSTRACT

In a glass chopped strand mat, a short chopped strand layer having first glass chopped strands with an average length of 25.4 to 76.2 mm and a long chopped strand layer having second glass chopped strands with an average length of 76.2 to 203.2 mm are laminated, a difference between the average length of the first glass chopped strands and that of the second glass chopped strands is 25.4 mm or greater, the short chopped strand layer occupies 50 to 70 parts by mass, and the long chopped strand layer occupies 30 to 50 parts by mass with respect to 100 parts by mass of the glass chopped strand mat, a mass per unit area of the glass chopped strand mat is 180 g/m² or lower, and a loss on ignition of the glass chopped strand mat measured on the basis of JIS R 3420 is lower than 10%.

9 Claims, 5 Drawing Sheets

(51) Int. Cl.
    *B32B 7/12*         (2006.01)
    *B32B 5/24*         (2006.01)
    *B29B 15/12*       (2006.01)
    *B32B 17/04*       (2006.01)
    *D04H 1/593*       (2012.01)
    *D04H 1/4218*      (2012.01)
    *D04H 1/58*         (2012.01)
    *D04H 1/4374*      (2012.01)
    *B32B 5/26*         (2006.01)
    *B32B 5/18*         (2006.01)
    *B32B 5/02*         (2006.01)
    *B32B 7/02*         (2006.01)

(52) U.S. Cl.
CPC ............... *B32B 5/024* (2013.01); *B32B 5/18* (2013.01); *B32B 5/24* (2013.01); *B32B 5/245* (2013.01); *B32B 5/26* (2013.01); *B32B 7/02* (2013.01); *B32B 7/12* (2013.01); *B32B 17/04* (2013.01); *B32B 27/06* (2013.01); *D04H 1/4218* (2013.01); *D04H 1/4374* (2013.01); *D04H 1/58* (2013.01); *D04H 1/593* (2013.01); *B32B 2255/02* (2013.01); *B32B 2255/26* (2013.01); *B32B 2260/021* (2013.01); *B32B 2260/046* (2013.01); *B32B 2262/101* (2013.01); *B32B 2266/0214* (2013.01); *B32B 2266/0278* (2013.01); *B32B 2307/30* (2013.01); *B32B 2307/54* (2013.01); *B32B 2307/718* (2013.01); *B32B 2555/02* (2013.01); *B32B 2605/08* (2013.01)

(58) Field of Classification Search
CPC .. D04H 1/593; B32B 17/04; B32B 2262/101; B32B 2307/718; B32B 5/24; B32B 5/26; B32B 2260/021; B32B 2260/046; B32B 5/024; B32B 5/245; B32B 5/18; B32B 2255/02; B32B 2255/26; B32B 2307/54; B32B 27/06; B32B 27/12; B32B 2605/08; B32B 2266/0214; B32B 2266/0278
See application file for complete search history.

(56) References Cited

U.S. PATENT DOCUMENTS

| | | |
|---|---|---|
| 4,520,154 A | 5/1985 | Moniotte |
| 4,587,296 A | 5/1986 | Moniotte |
| 5,910,458 A * | 6/1999 | Beer ................. B29C 70/083 442/367 |
| 2005/0095415 A1 | 5/2005 | Raghavendran |
| 2018/0099625 A1 | 4/2018 | Omiya et al. |

FOREIGN PATENT DOCUMENTS

| | | | |
|---|---|---|---|
| GB | 1180572 | * | 2/1967 |
| JP | S57-119015 A | | 1/1981 |
| JP | S58-017132 A | | 7/1981 |
| JP | S58-017132 A | | 2/1983 |
| JP | H06-093546 A | | 4/1994 |
| JP | 2003-175777 A | | 6/2003 |
| JP | 2009-520121 A | | 5/2009 |
| WO | 2007/070531 A2 | | 6/2007 |

OTHER PUBLICATIONS

Notice of Reasons for Rejection issued in corresponding Japanese Patent Application No. 2014/046597 dated Apr. 8, 2014.

International Preliminary Report on Patentability and Written Opinion issued in corresponding International Patent Application No. PCT/JP2014/084163 dated Sep. 22, 2016.

Office Action issued in related U.S. Appl. No. 15/124,299 dated Jan. 8, 2018.

Office Action issued in related U.S. Appl. No. 15/124,299 dated May 22, 2018.

* cited by examiner (a)

(b)

GLASS CHOPPED STRAND MAT, GLASS CHOPPED STRAND MAT ROLL, METHOD FOR MANUFACTURING GLASS CHOPPED STRAND MAT AND AUTOMOTIVE MOLDED CEILING MATERIAL

TECHNICAL FIELD

The present invention relates to a glass chopped strand mat in which glass chopped strands are deposited in a sheet shape and are bound together by a binder, a glass chopped strand roll, a method for manufacturing a glass chopped strand mat, and an automotive molded ceiling material.

BACKGROUND ART

As technical literature in this field, Japanese Unexamined Patent Publication No. H6-93546 is known. In this literature, a glass chopped strand mat is described which is manufactured by spraying a binder onto glass chopped strands deposited in a sheet shape, heating and melting the binder, and then allowing the binder to cool and solidify, thereby binding the glass chopped strands. In a method for manufacturing the glass chopped strand mat, short glass chopped strands having a length of 3 cm or greater and smaller than 8 cm and long glass chopped strands having a length of 8 cm or greater and smaller than 15 cm are uniformly dispersed and are thereafter fixed by the binder.

CITATION LIST

Patent Literature

Patent Literature 1: Japanese Unexamined Patent Publication No. H6-93546

SUMMARY OF INVENTION

Technical Problem

For a glass chopped strand mat, an enhancement in strength with a reduction in weight is required. In a glass chopped strand mat of the related art, the length of glass chopped strands is generally cut into 2 inches (50.8 mm), the same amount of glass chopped strands is allowed to fall onto two points on the front and rear sides in a transport direction. In the related art described in Patent Literature 1, in order that the glass chopped strands having different lengths are uniformly dispersed, the glass chopped strands are allowed to fall onto two points on the front and rear sides in the transport direction according to the same method.

In addition, the glass chopped strand wound into a roll shape around a winding core and is shipped and distributed as a glass chopped strand mat roll. When the glass chopped strand mat is unwound from the glass chopped strand mat roll so as to be used, if the glass chopped strand is torn, workability is degraded. Therefore, there is a demand for a glass chopped strand mat which has stretchability and is less likely to be broken.

In addition, the glass chopped strand mat is used as a reinforcing material of a molded product, in which the glass chopped strand mat is laminated and adhered onto a resin sheet. When the dispersion of glass chopped strands in the glass chopped strand mat is not uniform, there is concern that a portion having a changed shape, such as a deep drawn portion, may be torn or reduced in stiffness during processing of the molded product through press forming.

In addition, when the amount of the adhered binder is too high, the number of adhesion points becomes excessive, and there is concern than during cooling after the press forming, thin portions or hard portions may be generated in the mat. Therefore, the shape of the surface of the glass chopped strand mat may have an effect and cause wrinkles on the laminated outermost layer, and there is concern that in a case where an automotive molded ceiling material is molded, the appearance may be degraded.

An aspect of the present invention is made taking the foregoing problems into consideration, and an object thereof is to provide a glass chopped strand mat capable of achieving a reduction in weight with a small mass per unit area and enhancing strength even when the amount of a binder adhered is reduced, a glass chopped strand mat roll, a method for manufacturing a glass chopped strand mat, and an automotive molded ceiling material.

Solution to Problem

According to an aspect of the present invention, there is provided a glass chopped strand mat in which glass chopped strands are deposited in a sheet shape and are bound together by a binder made of a thermoplastic resin, a short chopped strand layer having first glass chopped strands with an average length of 1 to 3 inches (25.4 mm to 76.2 mm) and a long chopped strand layer having second glass chopped strands with an average length of 3 to 8 inches (76.2 to 203.2 mm) are laminated, a difference between the average length of the first glass chopped strands and the average length of the second glass chopped strands is 1 inch (25.4 mm) or greater, with respect to 100 parts by mass of the glass chopped strand mat, the short chopped strand layer occupies 50 to 70 parts by mass, and the long chopped strand layer occupies 30 to 50 parts by mass, a mass per unit area of the glass chopped strand mat is 180 g/m$^2$ or lower, and a loss on ignition of the glass chopped strand mat measured on the basis of JIS R 3420 is lower than 10%.

In the glass chopped strand mat according to the aspect of the present invention, the mass per unit area of the glass chopped strand mat is 180 g/m$^2$ or lower and thus a reduction in weight is achieved with a small mass per unit area. In addition, in the glass chopped strand mat, since the short chopped strand layer having the first glass chopped strands with an average length of 1 to 3 inches (25.4 mm to 76.2 mm) and the long chopped strand layer having the second glass chopped strands with an average length of 3 to 8 inches (76.2 to 203.2 mm) are laminated, an enhancement in strength is achieved compared to the related art. In addition, the loss on ignition of the glass chopped strand mat measured on the basis of JIS R 3420 is lower than 10%, and the amount of the adhered binder is lower than that in the related art. Accordingly, in the glass chopped strand mat, the strength can be enhanced even when the amount of the adhered binder is reduced while reducing the mass per unit area and achieving a reduction in weight.

In addition, the glass chopped strand mat includes the long chopped strand layer having the second glass chopped strands with an average length of 3 to 8 inches (76.2 to 203.2 mm). Therefore, when a molded product is processed through press forming, a portion having a changed shape, such as a deep drawn portion, may be prevented from being torn and reduced in stiffness. In addition, since the amount of the adhered binder is lower than that in the related art, the mat is prevented from having a thin portion, does not become too hard, and has appropriate flexibility. Therefore, workability and processibility are enhanced.

In addition, with respect to 100 parts by mass of the binder present in the glass chopped strand mat, the binder present in the short chopped strand layer may occupy 20 to 40 parts by mass, and the binder present in the long chopped strand layer may occupy 60 to 80 parts by mass.

According to another aspect of the present invention, there is provided a glass chopped strand mat roll in which the glass chopped strand mat is wound around a winding core into a roll shape, and the long chopped strand layer is disposed on an inside.

In the glass chopped strand mat roll according to the aspect of the present invention, the long chopped strands are disposed on the on the inside in the radial direction of the winding core, and the short chopped strand layer is disposed on the outside in the radial direction of the winding core. Therefore, the long chopped strand layer is covered with the short chopped strands, and the glass chopped strands are less likely to protrude toward the outside. Accordingly, when the glass chopped strand mat is unwound from the glass chopped strand mat roll, catching of the chopped strands can be suppressed. Therefore, fraying of the glass chopped strand mat can be prevented, tearing and thread missing can be prevented, and a reduction in strength can be suppressed. In addition, the glass chopped strand mat can be easily unwound from the glass chopped strand mat roll, and the workability during processing can be enhanced.

According to another aspect of the present invention, there is provided a method for manufacturing a glass chopped strand mat in which glass chopped strands cut into a predetermined length are deposited in a sheet shape and are bound together by a binder made of a thermoplastic resin, including: a first deposition process of forming first glass chopped strands having an average length of 1 to 3 inches (25.4 to 76.2 mm) by cutting the glass chopped strands using a first cutter, and forming a short chopped strand layer by depositing the first glass chopped strands to be deposited in a sheet shape; a second deposition process of forming second glass chopped strands having an average length of 3 to 8 inches (76.2 to 203.2 mm) by cutting the glass chopped strands using a second cutter, and forming a long chopped strand layer by depositing the second glass chopped strands on the short chopped strand layer in a sheet shape; a binder spraying process of spraying the binder made of the thermoplastic resin onto a laminate in which the short chopped strand layer and the long chopped strand layer are laminated; a heating process of heating the binder present in the laminate so as to be melted; and a cooling process of cooling the binder to bind the glass chopped strands after the heating process, in which a difference between the average length of the first glass chopped strands and the average length of the second glass chopped strands is 1 inch (25.4 mm) or greater, with respect to 100 parts by mass of the glass chopped strand mat, the short chopped strand layer occupies 50 to 70 parts by mass, and the long chopped strand layer occupies 30 to 50 parts by mass, a mass per unit area of the glass chopped strand mat is 180 g/m² or lower, and a loss on ignition of the glass chopped strand mat measured on the basis of JIS R 3420 is lower than 10%.

According to the method for manufacturing a glass chopped strand mat according to the aspect of the present invention, since the mass per unit area of the glass chopped strand mat is 180 g/m² or lower, a glass chopped strand mat which achieves a reduction in weight with a small mass per unit area can be manufactured. According to the manufacturing method, since the short chopped strand layer having the first glass chopped strands with an average length of 1 to 3 inches (25.4 to 76.2 mm) and the long chopped strand layer having the second glass chopped strands with a greater average length than that of the first glass chopped strands and an average length of 3 to 8 inches (76.2 to 203.2 mm) can be laminated, a glass chopped strand mat which achieves an enhancement in strength compared to the related art can be manufactured. In addition, in the glass chopped strand mat manufactured according to the manufacturing method, the loss on ignition measured on the basis of JIS R 3420 is lower than 10%, and the amount of the adhered binder is lower than that in the related art. Accordingly, the glass chopped strand mat capable of enhancing the strength even when the amount of the adhered binder is reduced while reducing the mass per unit area and achieving a reduction in weight can be manufactured.

In addition, it is preferable that the method for manufacturing a glass chopped strand further include: a winding process of winding the glass chopped strands around a winding core into a roll shape after the cooling process, in which in the winding process, the glass chopped strands are wound such that the long chopped strand layer is disposed on an inside.

According to another aspect of the present invention, there is provided an automotive molded ceiling material including: the glass chopped strand mat; and a resin foam sheet laminated and adhered onto the glass chopped strand mat.

According to the automotive molded ceiling material according to the aspect of the present invention, since the glass chopped strand mat is included, strength can be enhanced while achieving a reduction in weight. In addition, since the glass chopped strand mat includes the long chopped strand layer having the second glass chopped strands with an average length of 3 to 8 inches (76.2 to 203.2 mm), when a molded product is processed through press forming, a portion having a changed shape, such as a deep drawn portion, may be prevented from being torn and reduced in stiffness. In addition, since the amount of the adhered binder is lower than that in the related art, the mat is prevented from having a thin portion, does not become too hard, and has appropriate flexibility. Therefore, the generation of wrinkles on the outermost layer laminated on the glass chopped strand mat can be prevented. Accordingly, the degradation of the appearance of the automotive molded ceiling material can be suppressed.

Advantageous Effects of Invention

According to the aspect of the present invention, strength can be enhanced even when the amount of the adhered binder is reduced while reducing the mass per unit area and achieving a reduction in weight.

In addition, according to the aspect of the present invention, without poor dispersion of the glass chopped strands, the glass chopped strand mat can be prevented from being torn during processing.

DESCRIPTION OF EMBODIMENTS

Figure 1:
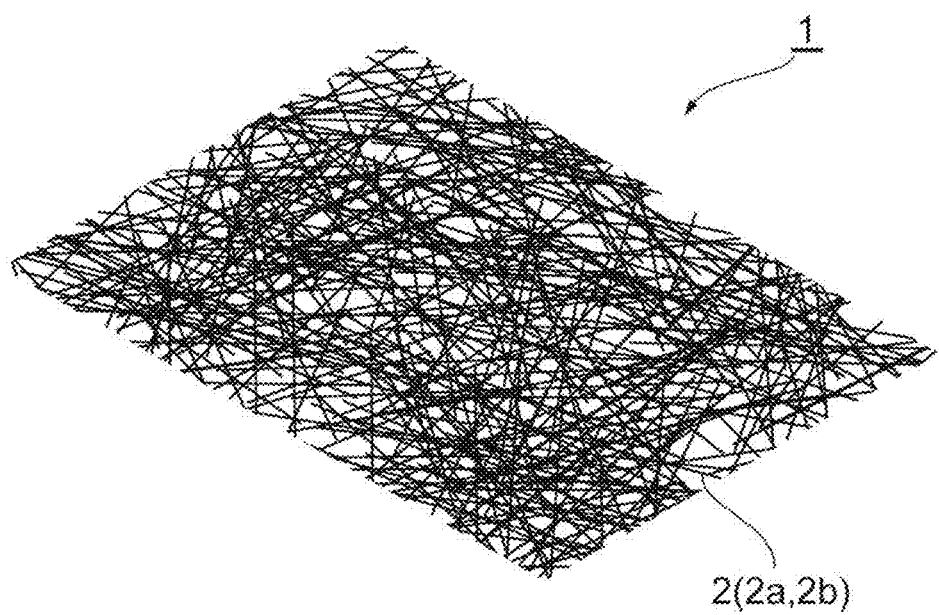
FIG. 1 is a view illustrating a glass chopped strand mat according to an embodiment.

Hereinafter, embodiments of a glass chopped strand mat, a glass chopped strand mat roll, a method for manufacturing a glass chopped strand mat, and an automotive molded ceiling material according to the present invention will be described in detail with reference to the drawings.

As illustrated in FIGS. 1 to 4, a glass chopped strand mat 1 according to this embodiment is formed by binding a number of glass chopped strands 2 deposited in a sheet shape with a binder 3 (see FIG. 4) made of a thermoplastic resin. For example, the glass chopped strand mat 1 is used as a reinforcing material in an automotive molded ceiling material 31 (see FIG. 3). The mass per unit area of the glass chopped strand mat 1 is 180 $g/m^2$ or smaller, preferably 20 to 150 $g/m^2$, more preferably 40 to 120 $g/m^2$, particularly preferably 40 to 100 $g/m^2$, and most preferably 45 to 95 $g/m^2$. In addition, the ratio of the mass of the binder 3 with respect to the glass chopped strands 2 is lower than 10 wt %, preferably 8.0 to 9.9 wt %, and more preferably 8.5 to 9.5 wt %.

The glass chopped strands 2 forming the glass chopped strand mat 1 are formed by cutting glass fiber bundles 5 unwound from glass cakes 4. As the glass chopped strands 2, first glass chopped strands 2a having an average length of 1 to 3 inches (25.4 to 76.2 mm), and second glass chopped strands 2b having an average length of 3 to 8 inches (76.2 to 203.2 mm). The average length of the first glass chopped strands 2a is preferably 1 to 2.5 inches (25.4 to 63.5 mm), and the average length of the second glass chopped strands 2b is preferably 3 to 5 inches (76.2 to 127.0 mm).

The average length of the second glass chopped strands is greater than the average length of the first glass chopped strands 2a by 1 inch (25.4 mm) or greater. When the difference in average length therebetween is 1 inch (25.4 mm) or greater, compared to a case where only the first glass chopped strands 2a are used, the strength of the glass chopped strand mat 1 is significantly enhanced, and compared to a case where only the second glass chopped strands 2b are used, the dispersibility of the glass chopped strands 2 in the glass chopped strand mat 1 is significantly enhanced, which is preferable. In addition, when the difference in average length therebetween is 1 to 2 inches (25.4 to 50.8 mm), the enhancement in strength and the enhancement in dispersibility are compatible with each other, which is preferable. Furthermore, the average of the average length of the first glass chopped strands 2a and the average length of the second glass chopped strands 2b is preferably 2 to 5 inches (50.8 mm to 127.0 mm) and more preferably 2 to 3 inches (50.8 to 76.2 mm).

The glass chopped strand mat 1 includes a short chopped strand layer 1a constituted by the first glass chopped strands 2a and a long chopped strand layer 1b constituted by the second glass chopped strands 2b. In the glass chopped strand mat 1, the short chopped strand layer 1a and the long chopped strand layer 1b are laminated in the thickness direction.

In addition, the glass chopped strand mat 1 is heated to incinerate the binder 3, and in a case where the following conditions 1), 2), and 3) are satisfied, it is assumed that the glass chopped strand mat 1 is formed by laminating the short chopped strand layer 1a and the long chopped strand layer 1b. 1) In a case where 100 glass chopped strands 2 (group i) are sequentially pulled from the outermost layer on one plane in the thickness direction and the lengths thereof are measured, 90% or more of the pulled glass chopped strands are included in a range (range i) of the median of the lengths±0.5 inches (12.7 mm). 2) In a case where 100 glass chopped strands 2 (group ii) are sequentially pulled from the outermost layer on the other plane in the thickness direction and the lengths thereof are measured, 90% or more of the pulled glass chopped strands are included in a range (range ii) of the median of the lengths±0.5 inches (12.7 mm). 3) The average length of the glass chopped strands which belong to the group i and have lengths included in the range i (that is, the glass chopped strands 2a (2b)) and the average length of the glass chopped strands which belong to the group ii and have lengths included in the range ii (that is, the glass chopped strands 2b (2a)) satisfy the above-described conditions.

With respect to 100 parts by mass of the glass chopped strand mat 1, the short chopped strand layer 1a occupies 50 to 70 parts by mass, and the long chopped strand layer 1b occupies 30 to 50 parts by mass.

The average length is the average of the lengths of the glass chopped strands 2 after being cut. It is preferable that the coefficient of variation in the lengths of the first glass chopped strands 2a included in the short chopped strand layer 1a (the standard deviation of the lengths/the average length) be 0.1 or lower. It is preferable that the coefficient of variation in the lengths of the second glass chopped strands 2b included in the long chopped strand layer 1b be 0.1 or lower. When the coefficient of variation in lengths is 0.1 or lower, the accuracy of the weight management of the glass chopped strand mat 1 is enhanced, which is preferable.

As a combination of the first glass chopped strands 2a and the second glass chopped strands 2b, a combination of 2 inches (50.8 mm) and 4 inches (101.6 mm) is preferable. In addition, as a combination of the first glass chopped strands 2a and the second glass chopped strands 2b, for example, a combination of 1 inch (25.4 mm) and 3 inches (76.2 mm) may be employed, and other combinations may also be employed.

It is preferable that the yarn count of the glass chopped strands 2 be 10 to 25 tex. In addition, for facilitating the formation of the glass chopped strands 2 through cutting of glass fiber bundles, it is preferable that the moisture content of the glass cake 4 be 5.0 wt % or less.

The yarn counts of the first glass chopped strands 2a and the second glass chopped strands 2b may be the same or may be different from each other. From the viewpoint of production efficiency, it is preferable that the yarn counts thereof be the same.

In addition, the yarn count of the glass chopped strands 2 may be selected depending on the mass per unit area of the glass chopped strand mat 1. For example, for the glass chopped strand mat 1 of 80 $g/m^2$ or lower, 10 to 15 tex glass chopped strands 2 are preferably used. Since the yarn count of the glass chopped strands 2 is in this range, the number of strands per unit weight is increased, and the generation of pores in the glass chopped strand mat 1 can be suppressed. On the other hand, for the glass chopped strand mat 1 of higher than 80 $g/m^2$, from the viewpoint of production efficiency, 15 to 25 tex glass chopped strands 2 are preferably used.

In addition, as the binder 3 for binding the glass chopped strands 2, a powder of thermoplastic resin such as an unsaturated polyester resin is used. It is preferable that the weight average particle size of the powder be 50 to 300 μm. The binder 3 is melted by being heated at a temperature of 170° C. to 280° C. for 20 to 70 seconds and is cooled to solidify, thereby binding the glass chopped strands 2 together.

In addition, the binder 3 is sprayed such that the ratio of the mass of the binder 3 in the manufactured glass chopped strand mat 1 to the glass chopped strands 2 to which the binder 3 is adhered is lower than 10 wt %. The ratio of the mass of the binder 3 to the glass chopped strands 2 to which the binder 3 is adhered is preferably 8.0 wt % to 9.9 wt %, and more preferably 8.5 wt % to 9.5 wt %. Here, the ratio of the mass of the binder 3 to the glass chopped strands 2 to which the binder 3 is adhered is substantially equivalent to the value of the loss on ignition of the entirety of the glass chopped strand mat 1, which is measured on the basis of JIS R 3420. In addition, when 10 wt % or more of the binder 3 is contained in the glass chopped strand mat 1, the glass chopped strand mat 1 becomes too hard and the formability thereof is degraded. Therefore, there may be a case where problems such as color unevenness in a molded product and easy formation of wrinkles are incurred.

It is preferable that with respect to 100 parts by mass of the binder 3 which is present in the manufactured glass chopped strand mat 1, the binder 3 which is present in the short chopped strand layer 1*a* occupy 20 to 40 parts by mass, and the binder 3 which is present in the long chopped strand layer 1*b* occupy 60 to 80 parts by mass. The amount of the binder 3 present in the long chopped strand layer 1*b* is more than that of the binder 3 contained in the short chopped strand layer 1*a*. In a case where a larger amount of the binder 3 is present in the long chopped strand layer 1*b*, a large number of adhesion points of the binder 3 are present for each of the second glass chopped strands 2*b* contained in the long chopped strand layer 1*b*. Since the second glass chopped strands 2*b* are intertwined with a larger number of strands than the first chopped strands contained in the short chopped strand layer 1*a* and a larger number of binder adhesion points are present in the second glass chopped strands 2*b*, a plurality of the glass chopped strands 2 are more efficiently connected and thus the strength of the glass chopped strand mat 1 is enhanced.

Figure 2:
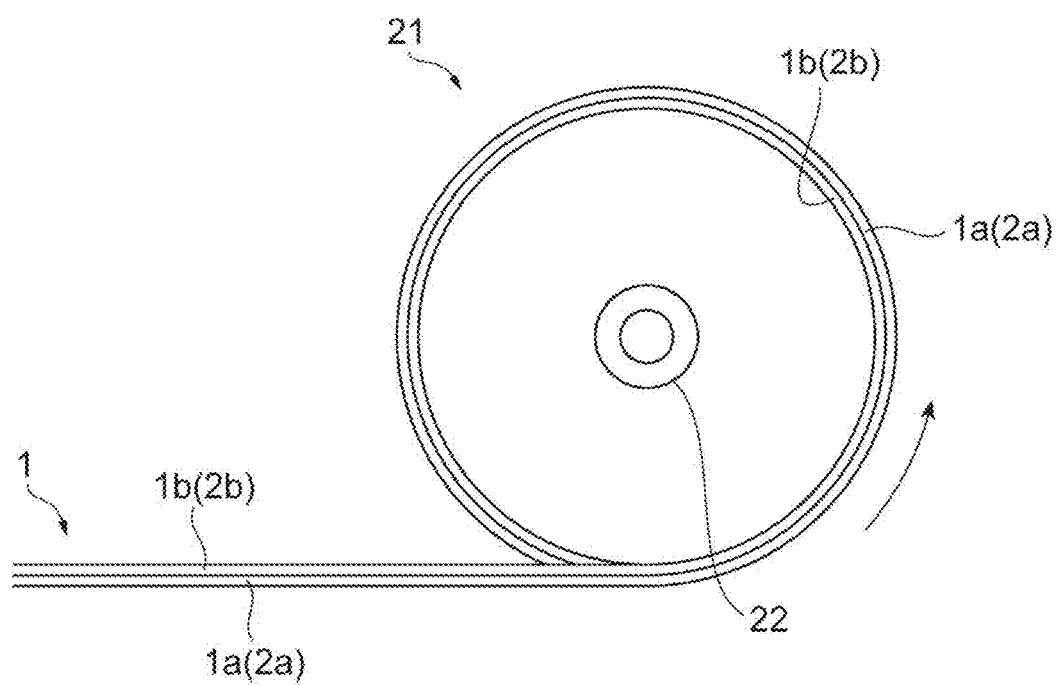
FIG. 2 is a view illustrating a glass chopped strand mat roll according to the embodiment viewed in an axial line direction of a winding core.

FIG. 2 is a view illustrating a glass chopped strand mat roll according to the embodiment viewed in the axial line direction of a winding core. As illustrated in FIG. 2, the glass chopped strand mat 1 is shipped as a glass chopped strand mat roll (hereinafter, referred to as a mat roll) 21 wound into a roll shape around a winding core 22. In the mat roll 21, the long chopped strand layer 1*b* is disposed on the inside in the radial direction, the short chopped strand layer 1*a* is disposed on the outside. The glass chopped strand mat 1 having a sheet shape in which the short chopped strand layer 1*a* is disposed on the lower side and the long chopped strand layer 1*b* is disposed thereon is transported in a horizontal direction and is wound around the winding core 22 disposed thereabove. The glass chopped strand mat 1 transported in the rightward direction of the figure is wound around the winding core 22 which rotates counterclockwise such that the long chopped strand layer 1*b* is disposed on the inside in the radial direction and the short chopped strand layer 1*a* is disposed on the outside in the radial direction.

Figure 3:
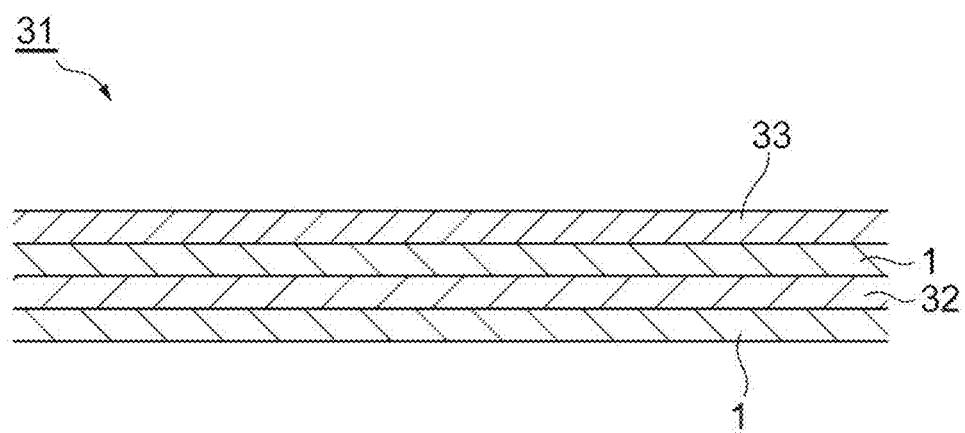
FIG. 3 is a schematic sectional view of an automotive molded ceiling material provided with the glass chopped strand mat according to the embodiment.

FIG. 3 is a schematic sectional view of an automotive molded ceiling material provided with the glass chopped strand mat. An automotive molded ceiling material 31 includes the glass chopped strand mat 1 as a reinforcing material. The automotive molded ceiling material 31 is provided with a resin foam sheet 32 and an outermost layer 33 adhered to the resin foam sheet 32 via the glass chopped strand mat 1. As the resin foam sheet 32, for example, a urethane foam material may be used. As the outermost layer 33, for example, non-woven fabric may be used.

Before being processed into the automotive molded ceiling material 31, the glass chopped strand mat 1 is coated with a resin (for example, isocyanate), and the glass chopped strand mat 1 is aged for 2 to 3 days to enter a semi-cured state.

The glass chopped strand mat 1 in the semi-cured state is disposed on each of both sides of the resin foam sheet 32 in the thickness direction, and the outermost layer 33 is disposed on the surface of the glass chopped strand mat 1 which is to become the surface side (vehicle interior) of the automotive molded ceiling material 31, and press forming is performed on the resultant, thereby manufacturing the automotive molded ceiling material 31. The glass chopped strand mat 1 functions as an adhesive for adhering the resin foam sheet 32 to the outermost layer 33 and also functions as a reinforcing material for enhancing the strength of the automotive molded ceiling material 31.

It is preferable that in each of the two glass chopped strand mats 1 used in the automotive molded ceiling material 31, the short chopped strand layer 1*a* be disposed on the vehicle interior side, and the long chopped strand layer 1*b* be disposed on the opposite side. When the automotive molded ceiling material 31 is press-formed, typically, a male die forms the vehicle interior side, and a female die forms the exterior side. That is, a compressive stress is applied to the vehicle interior side, and a tensile stress is applied to the exterior side. The first glass chopped strands 2*a* contained in the short chopped strand layer 1*a* has a smaller average length than that of the second glass chopped strands 2*b* contained in the long chopped strand layer 1*b* and thus has a small deformation amount under a compressive stress. Therefore, when the short chopped strand layer 1*a* is disposed on the vehicle interior side, even when a compressive stress is exerted, the formation of wrinkles in a deep drawn portion or the like is suppressed. On the other hand, the second glass chopped strands 2*b* contained in the long chopped strand layer 1*b* has a greater average length than that of the first glass chopped strands contained in the short chopped strand layer 1*a*, has a larger number of binder adhesion points for each strand, and thus has excellent tensile strength. Therefore, when the long chopped strand layer 1*b* is disposed on the exterior side, even when a tensile stress is exerted, the occurrence of a tear in a deep drawn portion or the like is suppressed.

A method for manufacturing the glass chopped strand mat 1 according to this embodiment will be described.

Figure 4:
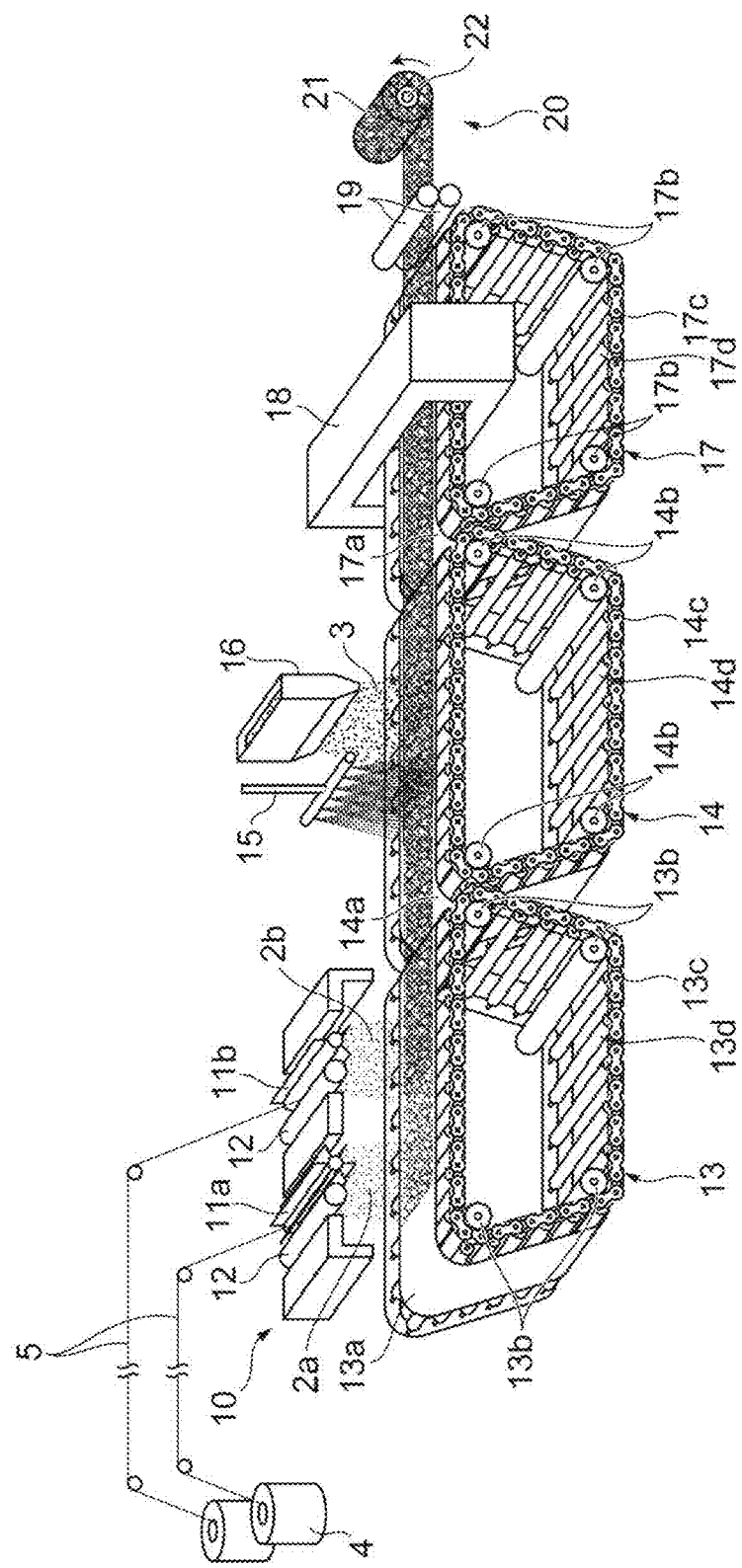
FIG. 4 is an explanatory view illustrating a manufacturing process of the glass chopped strand mat according to the embodiment.
Figure 5:
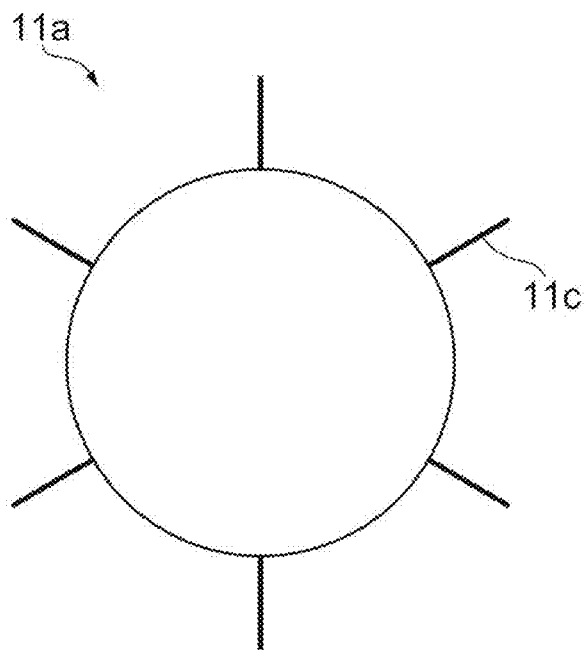
FIG. 5 is a schematic view illustrating a cutter roller in an axial line direction.
Figure 5:
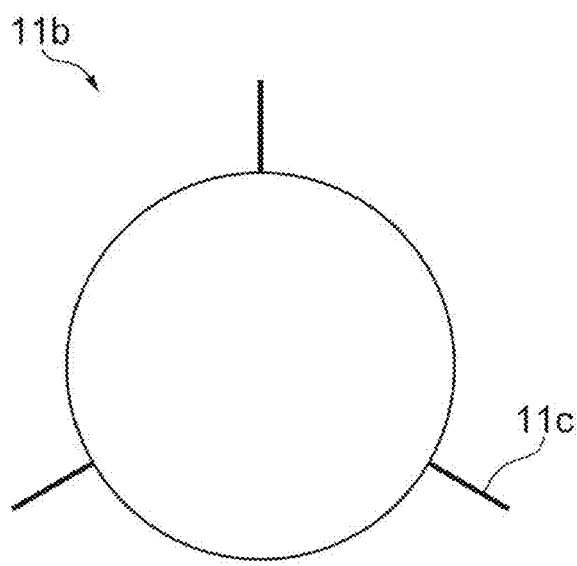

As illustrated in FIG. 4, in the method for manufacturing the glass chopped strand mat 1 according to this embodiment, the glass fiber bundles 5 unwound from a plurality of the glass cakes 4 are fed to a cutting device 10 and are cut into a predetermined length, thereby forming glass chopped strands 2. The cutting device 10 includes a plurality of cutter rollers 11*a* and 11*b* and a plurality of rubber rollers 12 in a transport direction of a first conveyor 13 disposed therebelow. As illustrated in FIG. 5, blades 11*c* for cutting the glass fiber bundles 5 are provided on the outer circumferences of the cutter rollers 11*a* and 11*b*.

The cutter roller 11*a* (front cutter) disposed on the front side in the transport direction functions as a first cutter that cuts the glass fiber bundles 5 into an average length of 1 to 3 inches (25.4 to 76.2 mm) and forms the first glass chopped strands 2*a*. The cutter roller 11*b* (rear cutter) disposed in the direction of the cutter roller 11*a* in the transport direction functions as a second cutter that cuts the glass fiber bundles 5 into an average length of 3 to 8 inches (76.2 to 203.2 mm) and forms the second glass chopped strands 2b.

By feeding the glass fiber bundles 5 between the cutter roller 11a and the rubber rollers 12 which rotate, the glass fiber bundles 5 are continuously cut and the first glass chopped strands 2a are formed. Here, the glass fiber bundles 5 are cut into an average length of 1 to 3 inches (25.4 to 76.2 mm) depending on the interval between the blades 11c in the circumferential direction of the cutter roller 11a. The first glass chopped strands 2a cut by the cutter roller 11a fall on a belt 13a of the first conveyor (deposition belt conveyor) disposed below the cutting device 10. The belt 13a of the first conveyor 13 rotates at a constant speed, and the first glass chopped strands 2a which fall from the cutting device 10 are deposited on the belt 13a in a uniform sheet shape. Accordingly, the first glass chopped strands 2a are deposited and the short chopped strand layer 1a is formed (first deposition process).

By feeding the glass fiber bundles 5 between the cutter roller 11b and the rubber rollers 12 which rotate, the glass fiber bundles 5 are continuously cut and the second glass chopped strands 2b are formed. Here, the glass fiber bundles 5 are cut into an average length of 3 to 8 inches (76.2 to 203.2 mm) depending on the interval between the blades 11c in the circumferential direction of the cutter roller 11b. The second glass chopped strands 2b cut by the cutter roller 11b fall on the first glass chopped strands 2a deposited on the belt 13a of the first conveyor 13. The second glass chopped strands 2b that fall from the cutting device 10 are deposited on the first glass chopped strands 2a on the belt 13a in a uniform sheet shape. Accordingly, the second glass chopped strands 2b are deposited on the short chopped strand layer 1a and the long chopped strand layer 1b is formed (second deposition process).

In addition, in the first deposition process and the second deposition process, the first glass chopped strands 2a and the second glass chopped strands 2b are deposited such that the difference in average length between the first glass chopped strands 2a and the second glass chopped strands 2b is 1 inch (25.4 mm) or greater, the short chopped strand layer 1a occupies 50 to 70 parts by mass and the long chopped strand layer 1b occupies 30 to 50 parts by mass with respect to 100 parts by mass of the glass chopped strand mat 1, and the mass per unit area of the glass chopped strand mat 1 is 180 g/m² or lower.

The first conveyor 13 transports the glass chopped strands 2 in a predetermined transport direction and includes four driving rollers 13b that extend in the width direction of the conveyor. An endless roller chain 13c is wrapped around each of both ends of the driving rollers 13b so as to form a trapezoidal shape with the four driving rollers 13b as apexes. The two roller chains 13c mesh with gear portions of both ends of the driving rollers 13b. The two roller chains 13c are connected with a plurality of connection rods 13d in a ladder shape, and the endless belt 13a is wrapped from the outside of the connection rods 13d.

In the first conveyor 13 configured as described above, when any of the driving rollers 13b is driven to rotate by a motor (not illustrated), the roller chains 13c are rotated in a predetermined rotational direction. When the connection rods 13d are rotated along with the roller chains 13c, the belt 13a on the connection rods 13d is rotated, and the glass chopped strands 2 (2a and 2b) on the surface of the belt 13a are transported in a predetermined rotational direction.

In the transport direction of the first conveyor 13, a second conveyor (binder spraying belt conveyor) 14 which is connected to the first conveyor 13 and forms a transport path of the glass chopped strands 2 is disposed. The second conveyor 14 has the same configuration as that of the first conveyor 13. The glass chopped strands 2 on the belt 13a of the first conveyor 13 are transported onto a belt 14a of the second conveyor 14 while maintaining a state of being deposited in a sheet shape.

Above and below the second conveyor 14, water sprayers 15 for spraying water onto the glass chopped strands 2 are disposed. The water sprayer 15 uniformly sprays water onto the glass chopped strands 2 deposited on the belt 14a in a sheet shape so as to wet both the upper and lower surfaces thereof. Here, the water sprayer 15 sprays water by adjusting the amount of the sprayed water and the sprayed state such that the ratio of the mass of the water adhered to the glass chopped strands 2 to the mass of the glass chopped strands 2 (the mass of the water adhered to the glass chopped strands 2/the mass of the glass chopped strands 2) is 30 to 90 wt % (more preferably 50 to 80 wt %). When water is sprayed in this manner, water droplets are selectively disposed at the points of intersection between the glass chopped strands forming the glass chopped strand mat 1 due to capillarity such that the binder 3 is moved and disposed to be pulled toward the water droplets. Therefore, the binder 3 can be efficiently adhered to the points of intersection between the glass chopped strands.

In addition, a binder sprayer 16 which sprays the binder 3 in the form of a powder onto the glass chopped strands 2 is disposed above the second conveyor 14. The binder sprayer 16 is disposed on the rear side of the water sprayer 15 and uniformly sprays the binder 3 onto the glass chopped strands 2 to which water is adhered (binder spraying process). Here, the binder sprayer 16 sprays the binder 3 by adjusting the amount of the binder 3 sprayed and the sprayed state such that the ratio of the mass of the binder 3 to the glass chopped strands 2 in the manufactured glass chopped strand mat 1 (the mass of the binder 3/the mass of the glass chopped strand mat 1) is lower than 10%. Regarding the amount of the binder 3 sprayed, the ratio of the mass of the binder 3 to the glass chopped strands 2 is preferably adjusted to be 8.0 to 9.9 wt %, and more preferably adjusted to be 8.5 to 9.5 wt %. Here, the ratio of the mass of the binder 3 to the glass chopped strands 2 may be measured according to loss on ignition based on JIS R 3420. In addition, the binder 3 is preferably sprayed by adjusting the amount of the binder 3 sprayed and the sprayed state such that with respect to 100 parts by mass of the binder 3 present in the glass chopped strand mat 1, the binder 3 present in the short chopped strand layer 1a occupies 20 to 40 parts by mass, and the binder 3 present in the long chopped strand layer 1b occupies 60 to 80 parts by mass.

In addition, as the form of the binder 3, a fiber form may be used instead of a powder form. The binder 3 formed in a fiber form is less likely to be dropped out from the gaps between the glass chopped strands 2 and the separated glass chopped strands 2 can be connected and bound together with a smaller mass than that of a powder form so that it is advantageous for the improvement of the yield ratio of the binder 3. On the other hand, in a case where the binder is not solid and is used as an emulsion, it is difficult to suppress the outflow of the binder from the gaps between the glass chopped strands 2.

In the transport direction of the second conveyor 14, a third conveyor (heating belt conveyor) 17 which is connected to the second conveyor 14 and forms a transport path of the glass chopped strands 2 is disposed. In the third conveyor 17, similar to the first conveyor 13, the third conveyor 17 includes four driving rollers 17b which extend in the width direction of the conveyor. An endless roller chain 17c is wrapped around each of both ends of the driving rollers 17b so as to form a trapezoidal shape with the four driving rollers 17b as apexes. The two roller chains 17c mesh with gear portions of both ends of the driving rollers 17b. The two roller chains 17c are connected with a plurality of connection rods 17d in a ladder shape, and the endless belt 17a is wrapped from the outside of the connection rods 17d.

The glass chopped strands 2 and the binder 3 on the belt 14a of the second conveyor 14 are transported onto the belt 17a of the third conveyor 17 while maintaining a state of being dispersed in a sheet shape.

In the middle of the third conveyor 17, a heating device 18 for heating the binder 3 is disposed. The heating device 18 heats the glass chopped strands 2 and the binder 3 transported by the third conveyor 17 at a temperature of 170° C. to 280° C. for 20 to 70 seconds (heating process). During the heating, the binder 3 adhered to the glass chopped strands 2 is melted and infiltrate into portions where the glass chopped strands 2 come into contact with each other.

In the transport direction of the third conveyor 17, upper and lower cooling rollers 19 forming a pair are disposed to pull the glass chopped strands 2 and the binder 3 on the belt 17a. The glass chopped strands 2 and the binder 3 are pressed into a mat shape and cooled by the cooling rollers 19 (cooling process). During the cooling, the binder 3 in a melted state solidifies and the glass chopped strands 2 are bound together, thereby manufacturing the glass chopped strand mat 1. The cooling rollers 19 transport the manufactured glass chopped strand mat 1 toward a winder 20 and the glass chopped strand mat 1 is wound around the winding core 22 by the winder 20 into a roll shape, thereby obtaining the mat roll 21. Here, the glass chopped strand mat is wound such that the second glass chopped strands 2b are positioned on the inside (the winding core 22 side) (winding process).

In the method for manufacturing the glass chopped strand mat according to this embodiment described above, the glass chopped strand mat 1 in which the mass per unit area is 180 g/m² or lower can be manufactured by appropriately setting the specification or amount of the glass chopped strands 2 deposited, the type of the binder 3, the amounts of water and the binder sprayed, heating and cooling temperatures, and the like.

In addition, in the method for manufacturing the glass chopped strand mat, the glass chopped strand mat 1 in which the loss on ignition measured on the basis of JIS R 3420 is lower than 10% can be manufactured. By measuring the loss on ignition, the amount of the adhered binder 3 present in the glass chopped strand mat 1 can be measured. Specifically, by heating and burning the binder 3 at 625° C. until the glass chopped strand mat 1 does not change in weight, a reduction in mass may be measured as the amount of the adhered binder 3.

According to the glass chopped strand mat 1 and the manufacturing method thereof in this embodiment, since the mass per unit area of the glass chopped strand mat is 180 g/m² or lower, a reduction in weight can be achieved with a small mass per unit area. In addition, in the glass chopped strand mat 1, the short chopped strand layer 1a having the first glass chopped strands 2a with an average length of 1 to 3 inches (25.4 to 76.2 mm) and the long chopped strand layer 1b having the second glass chopped strands with a greater average length than that of the first glass chopped strands 2a and an average length of 3 to 8 inches (76.2 to 203.2 mm) are laminated. Therefore, the glass chopped strand mat 1 achieves the enhancement in strength compared to the related art.

In addition, the loss on ignition of the glass chopped strand mat 1 measured on the basis of JIS R 3420 is lower than 10%, and the amount of the adhered binder is lower than that in the related art. Accordingly, in the glass chopped strand mat 1, the strength can be enhanced even when the amount of the adhered binder 3 is reduced while reducing the mass per unit area and achieving a reduction in weight. When the amount of the adhered binder 3 is too high, the number of adhesion points becomes excessive, and the glass chopped strand mat 1 is easily thinned and hardened when cooled during pressing. When the glass chopped strand mat 1 is thinned and hardened, the glass chopped strand mat 1 is not appropriately deformed and has poor followability during press forming into the automotive molded ceiling material 31 or the like, and wrinkles are concentrated on a deep drawn portion or the like. When the amount of the adhered binder 3 is low, the glass chopped strand mat 1 is relatively appropriately thick, becomes soft, and has stretchability, and thus the generation of wrinkles can be suppressed without an excessive tension during press forming. In addition, when the amount of the adhered binder 3 is low, the glass chopped strand mat does not become too hard and is appropriately impregnated with a resin (for example, isocyanate) therein.

In the glass chopped strand mat 1 and the mat roll 21 of this embodiment, the long chopped strand layer 1b is disposed on the inside in the radial direction of the winding core 22, and the short chopped strand layer 1a is disposed on the outside in the radial direction of the winding core 22. Therefore, the second glass chopped strands 2b which are long are covered with the first glass chopped strands 2a which are short, and the glass chopped strands 2 are less likely to protrude from the mat roll 21. Accordingly, when the glass chopped strand mat 1 is unwound from the mat roll 21, catching of the glass chopped strands 2 can be suppressed. Therefore, fraying of the glass chopped strand mat 1 can be prevented, tearing and thread missing can be prevented, and a reduction in strength can be suppressed. In addition, the glass chopped strand mat 1 can be easily unwound from the mat roll 21, and the workability during processing can be enhanced.

According to the automotive molded ceiling material 31 of this embodiment, since the glass chopped strand mat 1 described above is provided, the strength can be enhanced while achieving a reduction in weight. In addition, when a molded product is processed through press forming, a portion having a changed shape, such as a deep drawn portion, may be prevented from being torn and reduced in stiffness. In addition, since the amount of the adhered binder is lower than that in the related art, the mat is prevented from having a thin portion, does not become too hard, and has appropriate flexibility. Therefore, the generation of wrinkles on the outermost layer 33 laminated in the glass chopped strand mat 1 can be prevented. Accordingly, the degradation of the appearance of the automotive molded ceiling material 31 can be suppressed.

The present invention is not limited to the above-described embodiments, and the following various modifications can be made without departing from the gist of the present invention.

For example, water may be sprayed onto the glass chopped strands 2 substantially simultaneously with the deposition of the glass chopped strands 2 in the first conveyor 13. In addition, the water sprayer 15 may also be configured to spray water not from the upper side of the belt but from the lower side.

Instead of the three conveyors, the glass chopped strand mat 1 may also be manufactured by a single conveyor. In this case, it is preferable that the belt of the conveyor be configured as a mesh formed of fabric constituted by fibers such as aramid fiber, carbon fiber, and glass fiber.

In addition, in the above-described embodiment, the cutter roller 11a and the cutter roller 11b are respectively provided for forming the first glass chopped strands 2a and the second glass chopped strands 2b. However, a plurality of cutter rollers 11a and/or a plurality of cutter rollers 11b may be provided in the transport direction.

In addition, in the above-described embodiment, the glass chopped strand mat 1 is configured to include the short chopped strand layer 1a and the long chopped strand layer 1b. However, another chopped strand layer including third glass chopped strands having a different average length from those of the first glass chopped strands 2a and the second glass chopped strands 2b may also be provided.

In addition, in the above-described embodiment, the first glass chopped strands 2a are deposited and the second glass chopped strands 2b are deposited thereon. However, the second glass chopped strands 2b may be deposited and the first glass chopped strands 2a may be deposited thereon. In addition, the glass chopped strand mat 1 may have three or more layers.

In addition, in the above-described embodiment, the automotive molded ceiling material 31 having the glass chopped strand mat 1 is described. However, the glass chopped strand mat 1 may also be processed into another molded product. For example, the glass chopped strand mat may also be used for other components of a vehicle and may also be used for aircrafts and ships. The glass chopped strand mat 1 may also be used for other purposes such as waterproofing construction.

EXAMPLES

Hereinafter, Examples of the glass chopped strand mat according to the present invention will be described.

Example 1

In Example 1, the glass chopped strand mat 1 was manufactured by using facilities described in the method for manufacturing the glass chopped strand mat according to the above-described embodiment illustrated in FIG. 4. In Example 1, the average length of the first glass chopped strands 2a was set to 2 inches (50.8 mm), and the average length of the second glass chopped strands 2b was set to 4 inches (101.6 mm). The yarn count of both the first glass chopped strands 2a and the second glass chopped strands 2b was 23 tex. In addition, regarding the first glass chopped strands 2a and the second glass chopped strands 2b, the coefficient of variation in the lengths thereof was lower than 0.05. In Example 1, after the first glass chopped strands 2a were deposited on the belt 13a, the second glass chopped strands 2b were deposited such that the long chopped strand layer 1b was laminated on the short chopped strand layer 1a.

In addition, in Example 1, with respect to 100 parts by mass of the binder 3 present in the glass chopped strand mat 1, the binder 3 present in the short chopped strand layer 1a occupied 30 parts by mass, and the binder 3 present in the long chopped strand layer 1b occupied 70 parts by mass.

In addition, in Example 1, with respect to 100 parts by mass of the glass chopped strand mat 1, the short chopped strand layer 1a occupied 50 parts by mass, and the long chopped strand layer occupied 50 parts by mass.

In the heating device 18, the heating temperature was set to 220° C., and the heating time was set to 40 seconds. Under the above-described conditions, the glass chopped strand mat was manufactured.

Example 2

In Example 2, the glass chopped strand mat was manufactured under the same conditions as those of Example 1 except that the lamination order was changed so as to laminate the short chopped strand layer 1a on the long chopped strand layer 1b.

Comparative Example 1

In Comparative Example 1, the glass chopped strand mat was manufactured under the same conditions as those of Example 1 except that the short chopped strand layer 1a occupied 20 parts by mass and the long chopped strand layer 1b occupied 80 parts by mass with respect to 100 parts by mass of the glass chopped strand mat 1.

Comparative Example 2

In Comparative Example 2, the glass chopped strand mat was manufactured under the same conditions as those of Example 1 except that the short chopped strand layer 1a occupied 80 parts by mass and the long chopped strand layer 1b occupied 20 parts by mass with respect to 100 parts by mass of the glass chopped strand mat 1.

Comparative Example 3

In Comparative Example 3, the glass chopped strand mat was manufactured under the same conditions as those of Example 1 except that the short chopped strand layer 1a and the long chopped strand layer 1b were not formed and the first glass chopped strands 2a and the second glass chopped strands 2b were mixed in equal proportions.

Comparative Example 4

In Comparative Example 4, the glass chopped strand mat was manufactured under the same conditions as those of Example 1 except that the amount of the glass chopped strands 2 was increased so that the mass per unit area was twice that of Example 1.

Reference Example 1

In Reference Example 1, the glass chopped strand mat was manufactured under the same conditions as those of Example 1 except that the glass chopped strands 2 having an average length of 2 inches (50.8 mm) were deposited on the belt 13a from the two cutter rollers disposed on the front and rear sides in the transport direction.

Examples 1 and 2, Comparative Examples 1 to 4, and Reference Example 1 described above were evaluated. Implementation conditions and the evaluation of the manufactured glass chopped strand mats of Examples 1 and 2, Comparative Examples 1 to 4, and Reference Example 1 are shown in Table 1.

TABLE 1

| | | Example 1 | Example 2 | Comparative Example 1 | Comparative Example 2 | Comparative Example 3 | Comparative Example 4 | Reference Example 1 |
|---|---|---|---|---|---|---|---|---|
| Average length of first glass chopped strands CS1 (inch) | | 2 | 2 | 2 | 2 | 2 | 2 | 2 |
| Average length of second glass chopped strands CS2 (inch) | | 4 | 4 | 4 | 4 | 4 | 4 | Absent |
| Lamination order | | CS1→CS2 | CS2→CS1 | CS1→CS2 | CS1→CS2 | Absent (mixed) | CS1→CS2 | Absent (1 layer) |
| Weight ratio between binder 3 in short chopped strand layer 1a and binder 3 in long chopped strand layer 1b | | 30/70 | 70/30 | 30/70 | 30/70 | — | — | — |
| Weight ratio between CS1 and CS2 | | 50/50 | 50/50 | 20/80 | 80/20 | 50/50 | 50/50 | — |
| Mass per unit area | Average | 89 | 89 | 90 | 85 | 87 | 187 | 90 |
| | Standard deviation | 4.7 | 6.2 | 8.5 | 5.1 | 5.5 | 8 | 4.2 |
| Loss on ignition (%) | Average | 8.9 | 8.7 | 9.3 | 9.1 | 10 | 7.2 | 11 |
| Mat width direction tensile strength (N) | Average | 178 | 156 | 176 | 134 | 158 | 450 | 160 |
| | Standard deviation | 47 | 57 | 68 | 52 | 50 | 69 | 38 |
| Elongation at break (mm) | Average | 1.5 | 1.6 | 1.6 | 1.2 | 1.4 | 1.5 | 1.1 |
| Porosity (%) | | 35.3 | 35.8 | 39.7 | 32.3 | 36.3 | 18.7 | 31.4 |
| Molded product weight variation | | A | A | B | A | A | B | A |
| Molded product appearance | | A | A | C | A | B | A | A |

Regarding the evaluation of the glass chopped strand mats, the mass per unit area (g/m²), loss on ignition (%), mat width direction tensile strength (N), elongation at break (mm), porosity (%), molded product mass variation, and molded product appearance were evaluated.

The weight ratio between the binder 3 in the short chopped strand layer 1a and the binder 3 in the long chopped strand layer 1b was measured as follows.

From the glass chopped strand mat 1 of 30 cm (length)×30 cm (width), 16 test pieces of 1 inch (25.4 mm)×1 inch (25.4 mm) were obtained. Next, both surfaces of each of the test pieces were observed with a microscope, and the number of adhesion and intersection points of the binder 3 in the long chopped strand layer 1b (4 inches (101.6 mm)) in one surface and the number of adhesion and intersection points of the binder 3 in the short chopped strand layer 1a (2 inches (50.8 mm)) in the other surface were counted. In addition, by averaging the proportions of the numbers of points of intersection of the test pieces, the ratio of the number of intersection points of the binder 3 was obtained. The ratio of the number of intersection points of the binder 3 is substantially the same as the weight ratio of the binder 3.

The mass per unit area was measured as follows. First, a test piece of 30 cm (length)×30 cm (width) was cut from the glass chopped strand mat 1, and the weight of the test piece was measured to two decimal places by a scale. Next, the weight was divided by the area of 30 cm (length)×30 cm (width), thereby obtaining the mass per unit area in units of g/m².

The loss on ignition was measured on the basis of JIS R 3420.

Specifically, the loss on ignition (%) was measured according to the following method. First, an area of 30 cm (length)×30 cm (width) was cut from the glass chopped strand mat 1 to be used as a test piece. Next, the weight of the test piece was measured to three decimal points by the scale, and the binder 3 was heated at 625° C. according to JIS R 3420 until there is no change in weight so as to be burnt out. After the heating, after the test piece was cooled to room temperature, the weight was measured again to three decimal points by the scale, and a reduction in weight from the weight before the heating (a reduction in weight/weight before heating×100; unit %) was expressed as percentage as the loss on ignition.

In Example 1, the loss on ignition was 8.9%. In Comparative Example 3, the loss on ignition was 10%.

The mat width direction tensile strength (N) and the elongation at break (mm) were measured in the following method. First, a direction along the winding direction of the glass chopped strand mat 1 was assumed to be lengthwise, and an area of 15 cm (length)×30 cm (width) was cut into a test piece. Next, the test piece was disposed in a tension and compression tester (manufactured by IMADA SEISAKUSHO CO., LTD.) so that the direction of 30 cm (width) follows the vertical direction, both the upper and lower ends were held, and a test was performed with an inter-span distance of 200 mm and a test speed of 200 mm/min. The maximum load was measured as the mat width direction tensile strength (N). Furthermore, a stroke distance when a point representing the maximum load was reached was recorded as the elongation at break (mm).

The mat width direction tensile strength in Example 1 had a higher value than those of Comparative Examples 1 to 3 even though the amount of the adhered binder 3 was small, and thus Example 1 had higher strength. The strength in Example 2 was higher than that of Comparative Example 2 even though the amount of the adhered binder 3 was small.

Regarding the measurement of the porosity (%), a test piece was obtained from the glass chopped strand mat 1, the test piece was photographed, and an obtained image was subjected to binarization processing. Next, white and black areas of pores after binarization were measured (portions where glass fiber was present were white, portions where glass fiber was not present were black, and the numerical values in Table 1 represent the ratios of the portions where the glass fiber was not present to the entirety).

The porosity in Example 1 had a lower value than those of Comparative Examples 1 and 3 such that it can be said that the glass fiber was not poorly dispersed and the number of pores is small.

Regarding the molded product weight variation, ten automotive molded ceiling materials 31 of 1.5 m² were manufactured using the glass chopped strand mat 1, and the weights thereof were measured. Among the ten materials measured, a case where a variation in weight from a reference weight did not exceed 30 g was evaluated as A, and a case where a variation in weight from the reference weight exceeded 30 was evaluated as B.

There were small variations in weight in Examples 1 and 2, and there was a great variation in Comparative Example 1.

Regarding the molded product appearance, in a case where the automotive molded ceiling material 31 was manufactured using the glass chopped strand mat 1, a pattern generated due to the denseness of the glass fiber distribution in the glass chopped strand mat 1 was observed with the naked eye. A case where substantially no pattern was confirmed with the naked eye was evaluated as A, a case where a slight pattern was confirmed with the naked eye but the material could be accepted as a product was evaluated as B, and a case where a pattern was confirmed with the naked eye and the material was not accepted as a product was evaluated as C.

In Examples 1 and 2, denseness of the glass fiber could not be confirmed. In Comparative Example 1, a pattern caused by the denseness of the glass fiber could be confirmed with the naked eye.

In addition, in Example 3 and Comparative Example 5, by changing, as shown in Table 2, the winding direction of the glass chopped strand mat 1 of Example 1 described above, the glass chopped strand mat 1 was wound around the winding core to produce a mat roll. In addition, measurement was performed on glass fiber (glass chopped strands) protruding from the mat roll. The measurement results are shown in Table 2. In addition, FIGS. 2 and 4 illustrate the glass chopped strand mat roll of Example 3 and a production process thereof

TABLE 2

| | Example 3 | Comparative Example 5 |
|---|---|---|
| Short glass chopped strand layer in roll | Outside | Inside |
| Long glass chopped strand layer in roll | Inside | Outside |
| Number of strands protruding from roll when wound around paper core (winding core) with an outer diameter of 100 mm | 21 | 34 |
| (Evaluation standard) | A | B |

The mat roll was evaluated as follows. A test piece of 30 cm×30 cm was cut from the glass chopped strand mat 1 and was wound around the winding core with an outer diameter of 100 mm, and the number of glass chopped strands 2 protruding from a range having an area of about 470 cm², which is half the circumference of the winding core, was counted with the naked eye. The case of lower than a reference value (30) was evaluated as A, and the case of higher than the reference value was evaluated as B.

In Example 3, the number of glass chopped strands 2 protruding from the mat roll was 21 and was smaller than that in Comparative Example 5.

REFERENCE SIGNS LIST 1 glass chopped strand mat
1a short chopped strand layer
1b long chopped strand layer
2 glass chopped strand
2a first glass chopped strand
2b second glass chopped strand
3 binder
4 glass cake
10 cutting device
11a cutter roller (first cutter)
11b cutter roller (second cutter)
13 first conveyor
13a, 14a, 17a belt
14 second conveyor
15 water sprayer
16 binder sprayer
17 third conveyor
18 heating device
19 cooling roller
20 winder
21 glass chopped strand mat roll
22 winding core
31 automotive molded ceiling material
32 resin foam sheet
33 outermost layer

The invention claimed is:

1. An automotive molded ceiling material comprising:
a glass chopped strand mat in which glass chopped strands are deposited in a sheet shape and are bound together by a binder made of a thermoplastic resin; and
a resin foam sheet laminated and adhered onto the glass chopped strand mat,
wherein a short chopped strand layer having first glass chopped strands with an average length of 25.4 mm to 76.2 mm and a long chopped strand layer having second glass chopped strands with an average length of 76.2 to 203.2 mm are laminated,
a difference between the average length of the first glass chopped strands and the average length of the second glass chopped strands is 25.4 mm or greater,
with respect to 100 parts by mass of the glass chopped strand mat, the short chopped strand layer occupies 50 to 70 parts by mass, and the long chopped strand layer occupies 30 to 50 parts by mass,
a mass per unit area of the glass chopped strand mat is 180 g/m² or lower, and
a loss on ignition of the glass chopped strand mat measured on the basis of JIS R 3420 is lower than 10%.

2. The automotive molded ceiling material according to claim 1, wherein, with respect to 100 parts by mass of the binder present in the glass chopped strand mat, the binder present in the short chopped strand layer occupies 20 to 40 parts by mass, and the binder present in the long chopped strand layer occupies 60 to 80 parts by mass.

3. The automotive molded ceiling material according to claim 1,
wherein the glass chopped strand mat is wound around a winding core into a roll shape, and
the long chopped strand layer is disposed on an inside.

4. The automotive molded ceiling material according to claim 1, wherein the yarn counts of the first glass chopped strands and the second glass chopped strands are the same.

5. The automotive molded ceiling material according to claim 1, wherein the first glass chopped strands has an average length of 25.4 mm to 63.5 mm , and the second glass chopped strands has an average length of 76.2 to 127.0 mm.

6. The automotive molded ceiling material according to claim 1, wherein the mass per unit area of the glass chopped strand mat is from 20 to 150 g/m².

7. The automotive molded ceiling material according to claim 1, wherein the mass per unit area of the glass chopped strand mat is from 45 to 95 g/m².

8. The automotive molded ceiling material according to claim 1, wherein the loss on ignition of the glass chopped strand mat measured on the basis of JIS R 3420 is from 8.5 to 9.5 wt %.

9. The automotive molded ceiling material according to claim 1, wherein
- the first glass chopped strands has an average length of 25.4 mm to 63.5 mm,
- the second glass chopped strands has an average length of 76.2 to 127.0 mm;
- the mass per unit area of the glass chopped strand mat is from 45 to 95 g/m$^2$; and
- the loss on ignition of the glass chopped strand mat measured on the basis of JIS R 3420 is from 8.5 to 9.5 wt %.

* * * * *